E. A. APPELL.
LIQUID MEASURING DEVICE.
APPLICATION FILED MAR. 5, 1913.
1,094,291.
Patented Apr. 21, 1914.
3 SHEETS—SHEET 1.
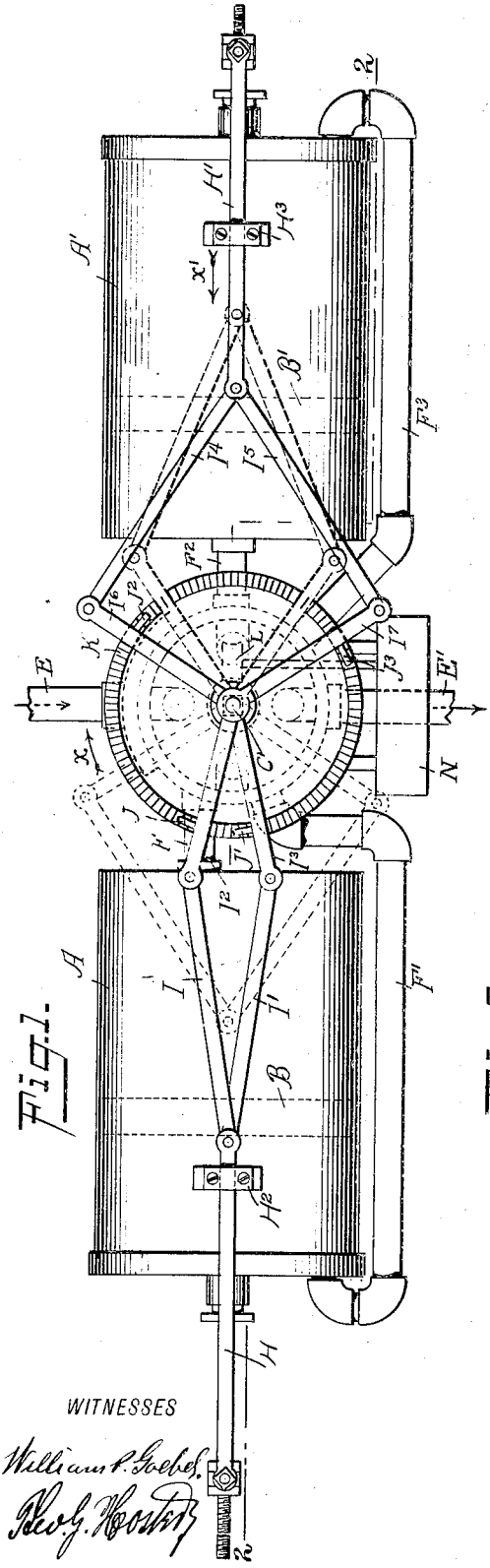
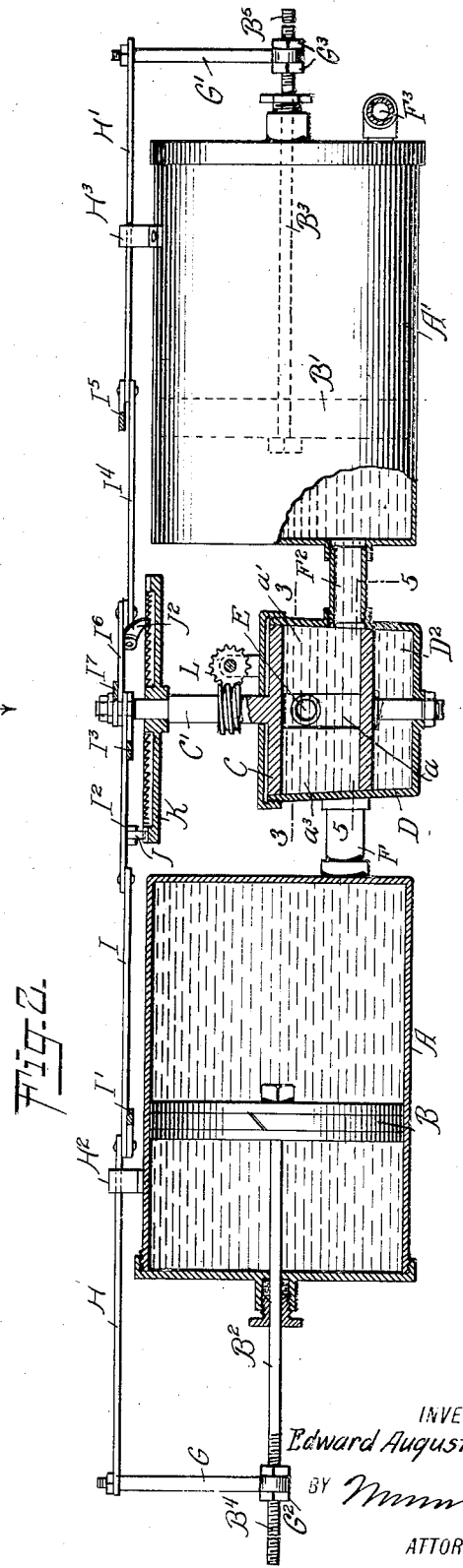
WITNESSES
INVENTOR
Edward August Appell
BY
ATTORNEYS E. A. APPELL.
LIQUID MEASURING DEVICE.
APPLICATION FILED MAR. 5, 1913.
1,094,291.
Patented Apr. 21, 1914.
3 SHEETS—SHEET 2.
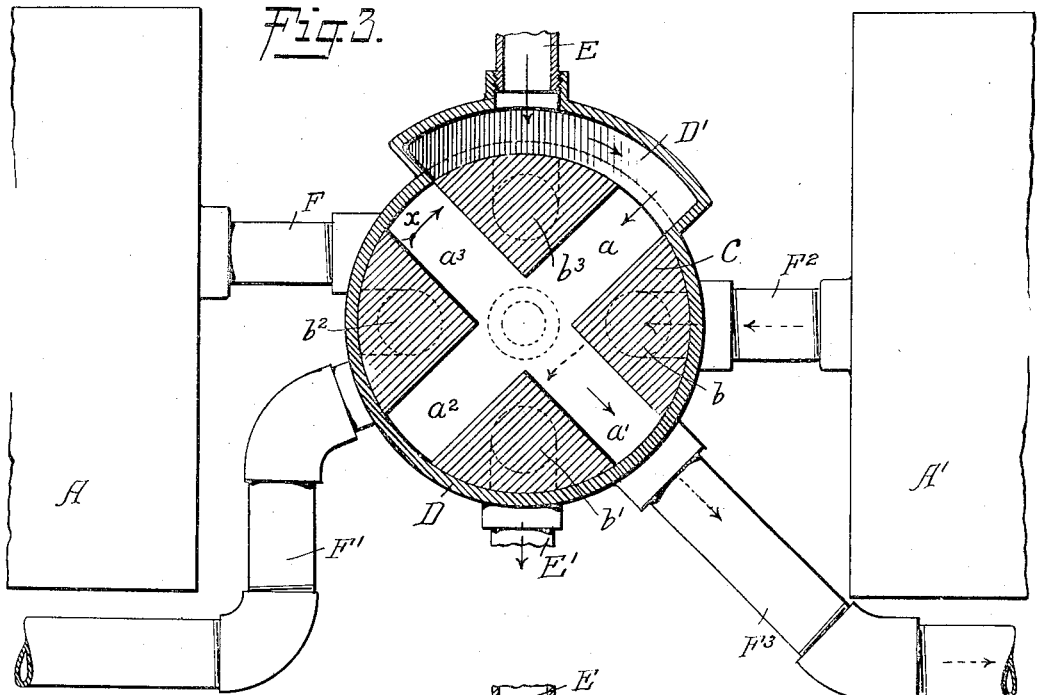
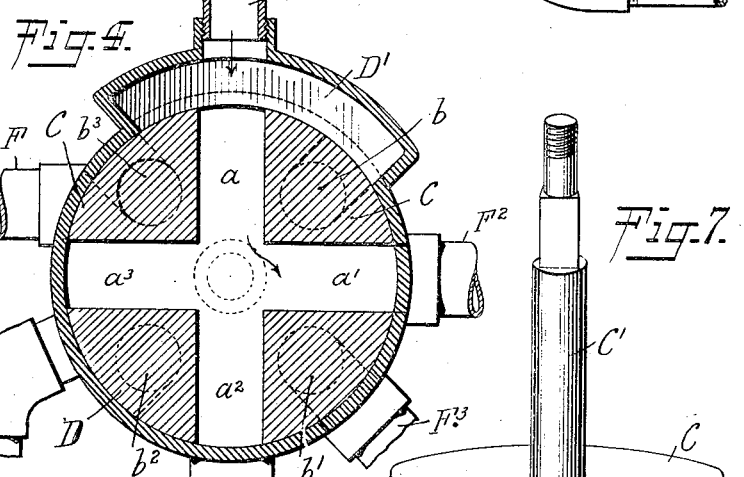
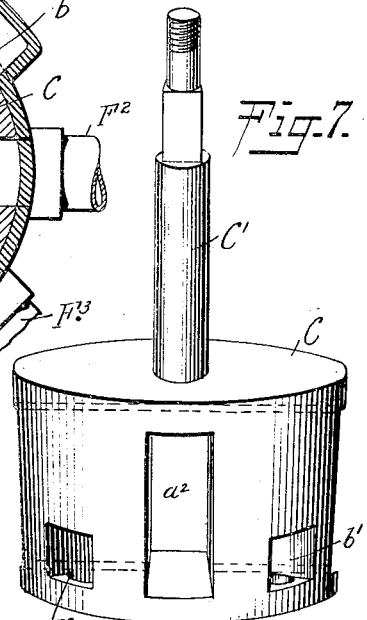
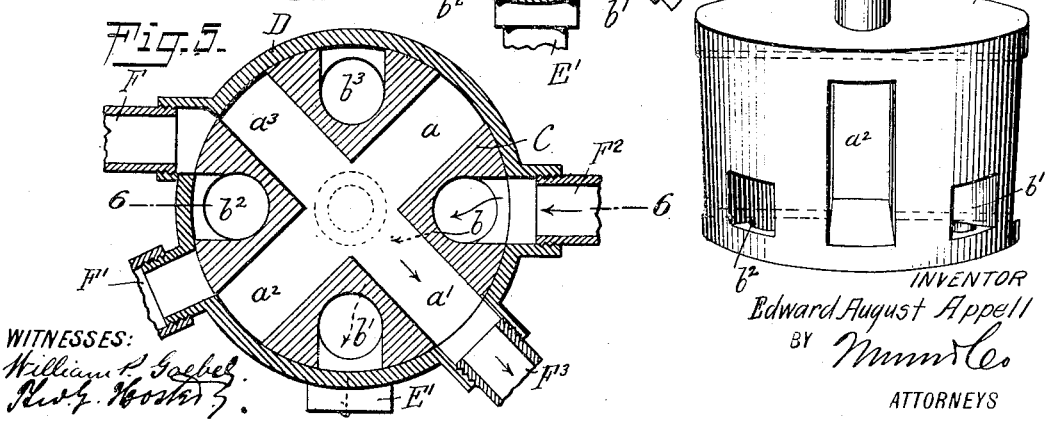
WITNESSES:
William P. Goebel
Rudy. Koster
INVENTOR
Edward August Appell
BY Munn & Co.
ATTORNEYS

E. A. APPELL.
LIQUID MEASURING DEVICE.
APPLICATION FILED MAR. 5, 1913.

1,094,291.

Patented Apr. 21, 1914.

3 SHEETS—SHEET 3.

WITNESSES

INVENTOR
Edward August Appell
BY Munn & Co.
ATTORNEYS

UNITED STATES PATENT OFFICE.

EDWARD AUGUST APPELL, OF NEW YORK, N. Y.

LIQUID-MEASURING DEVICE.

1,094,291.

Specification of Letters Patent.  Patented Apr. 21, 1914.

Application filed March 5, 1913. Serial No. 752,072.

*To all whom it may concern:*

Be it known that I, EDWARD AUGUST APPELL, a subject of the German Emperor, and a resident of the city of New York, borough of the Bronx, in the county and State of New York, have invented a new and Improved Liquid-Measuring Device, of which the following is a full, clear, and exact description.

The object of the invention is to provide a new and improved liquid measuring device more especially designed for measuring liquids periodically drawn from a barrel or other container.

In order to accomplish the desired result use is made of a valve casing provided with an inlet and an outlet for the fluid and adapted to be connected with the container containing a liquid to be measured, a valve mounted to turn in the said valve casing and having sets of inlet and outlet ports, actuating and measuring devices connected with the said valve casing to be filled and emptied either with the liquid withdrawn from the container or with the air flowing into the container or withdrawing the liquid therefrom, the said actuating devices having movable members under the influence of the pressure of the fluid passing into and out of the actuating and measuring devices, and driving means connecting the said movable members of the actuating and measuring devices with the said valve for imparting a continuous rotary motion to the same on withdrawing a portion of the liquid from the container.

A practical embodiment of the invention is represented in the accompanying drawings forming a part of this specification, in which similar characters of reference indicate corresponding parts in all the views.

Figure 8:
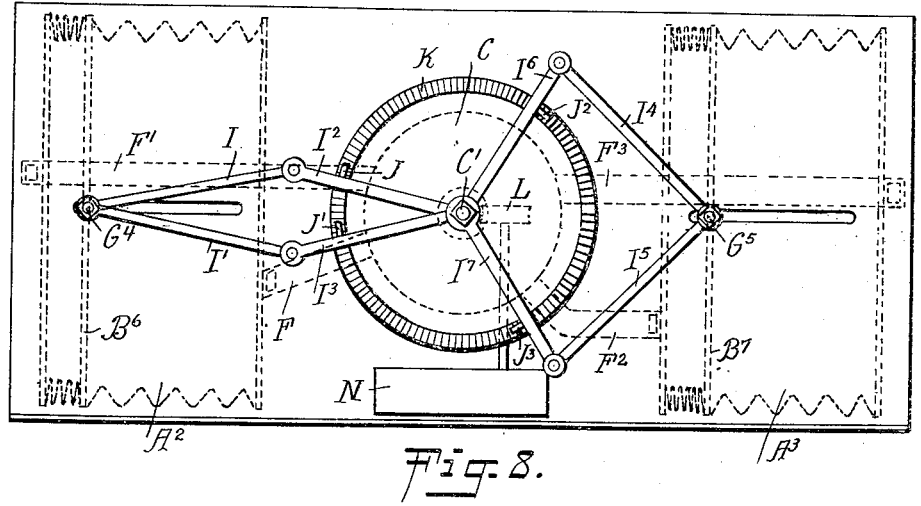
Figure 9:
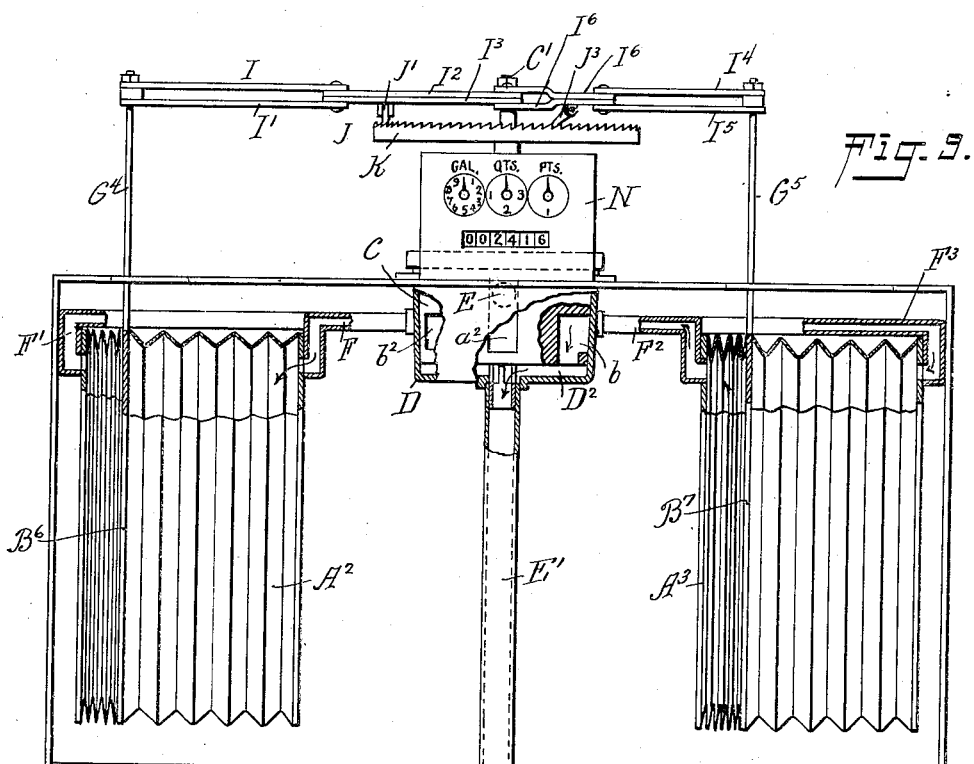

Figure 1 is a plan view of the liquid measuring device for measuring the liquid flowing out of its container and through the measuring device; Fig. 2 is a sectional side elevation of the same substantially on the line 2—2 of Fig. 1; Fig. 3 is an enlarged partly sectional plan view of the valve and connections, the section being on the line 3—3 of Fig. 2; Fig. 4 is a similar view of the same showing the valve in a different position; Fig. 5 is a similar view of the same on the line 5—5 of Fig. 2; Fig. 6 is a reduced sectional side elevation of the valve on the line 6—6 of Fig. 5; Fig. 7 is a perspective view of the valve; Fig. 8 is a plan view of a modified form of the liquid measuring device for measuring the liquid by the amount of air passing by way of the liquid measuring device into the container; and Fig. 9 is a sectional side elevation of the same, parts being in elevation.

In the construction disclosed in Figs. 1 to 7, use is made of two measuring receptacles A and A' in the form of cylinders, in which reciprocate pistons B, B' connected, as hereinafter more fully described, with the stem C' of a rotary valve C mounted to turn in a valve casing D located between the measuring receptacles A and A'. The valve casing D is provided with an inlet pipe E connected with a barrel or other vessel containing the liquid to be measured, and the outlet pipe E' is connected with a draw-off faucet (not shown) under the control of a barkeeper or other person for drawing off periodically any desired amount of the liquid into a glass or other vessel.

The valve casing D is provided at the rear with an inlet chamber D' (see Figs. 3 and 4) connected with the supply pipe E, and the valve C is provided with a series of inlet ports $a$, $a'$, $a^2$, $a^3$ arranged in the form of a cross, as plainly shown in Figs. 3, 4 and 5. The outer ends of the inlet ports $a$, $a'$, $a^2$ and $a^3$ are spaced equal distances apart and are so arranged that, at least, one of the said ports is in register with the inlet chamber D' to insure a continuous flow of the liquid through the ports whenever the faucet connected with the outlet pipe E' is opened. The outer ends of the ports $a$, $a'$, $a^2$ and $a^3$ are adapted to register with pipes F, F', F$^2$ and F$^3$ attached to the casing D, and of which the pipes F and F$^2$ connect with the inner ends of the measuring receptacles A and A', while the pipes F' and F$^3$ connect with the outer ends of the said measuring receptacles A and A'.

The valve C is further provided with a set of angular outlet ports $b$, $b'$, $b^2$, $b^3$ adapted to connect with the pipes F, F', F$^2$ and F$^3$ at the time the inlet ports $a$, $a'$, $a^2$ and $a^3$ are disconnected from the same, and the said outlet ports $b$, $b'$, $b^2$ and $b^3$ discharge into an outlet chamber D$^2$ formed in the bottom of the valve casing D and connected with the outlet pipe E'. It is understood that the outlet ports $b$, $b'$, $b^2$ and $b^3$ are arranged intermediate the ports $a$, $a'$, $a^2$ and $a^3$, as will be readily understood by reference to Figs. 3, 4 and 5.

The means for turning the valve C from the pistons B, B' are arranged as follows: The piston rods $B^2$ and $B^3$ of the pistons B and B' extend through the outer heads of the measuring receptacles A and A', and the outer ends $B^4$, $B^5$ of the said piston rods $B^2$, $B^3$ are threaded to adjustably support arms G, G' by the use of sets of nuts $G^2$, $G^3$ screwing on the threaded ends $B^4$, $B^5$. The arms G and G' are connected with the outer ends of slides H, H' mounted to slide in suitable bearings $H^2$, $H^3$ arranged on the top of the measuring receptacles A, A'. The inner end of the slide H is pivotally connected with a toggle lever consisting of the arms I, I', $I^2$, $I^3$, of which the outer ends of the arms I, I' are pivotally connected with the slide H and the arms I and $I^2$ are pivotally connected with each other and the arms I' and $I^3$ are pivotally connected with each other. The inner ends of the arms $I^2$, $I^3$ are loosely fulcrumed on the stem C' of the valve C (see Figs. 1 and 2), and on the said arms $I^2$, $I^3$ are pivoted pawls J, J' engaging the teeth of a ratchet wheel K attached to the valve stem C'. The pawls J and J' are so arranged that when the toggle lever opens on the inward movement of the slide H then the pawl J turns the ratchet wheel K, while the pawl J' glides over the teeth of the ratchet wheel, and when the toggle lever closes on the outward movement of the slide H then the pawl J' turns the ratchet wheel K while the pawl J glides over the teeth of the ratchet wheel. Similarly a toggle lever connection is made between the slide H' and the ratchet wheel K, that is, the inner end of the slide H' is pivotally connected with arms $I^4$, $I^5$, pivotally connected with arms $I^6$, $I^7$ loosely fulcrumed at their inner ends on the valve stem C'. The arms $I^6$ and $I^7$ are provided with pawls $J^2$, $J^3$ arranged in such a manner that when the toggle lever moves into open position on the inward movement of the slide H' then the pawl $J^3$ turns the ratchet wheel K while the pawl $J^2$ glides over the teeth of the said ratchet wheel. When the toggle lever closes on the outward movement of the slide H' then the pawl $J^2$ turns the ratchet wheel K while the pawl $J^3$ glides over the teeth of the said ratchet wheel.

From the foregoing it will be seen that the reciprocating motion of either piston B, B' causes a continuous rotary motion of the valve C, that is, the latter is turned in the direction of the arrow $x$.

The valve stem C' is connected by suitable gearing L with a register N of any approved construction and arranged to indicate the amount of liquid measured in gallons, quarts and pints or other suitable standard of liquid measure (see Fig. 9).

The operation is as follows: Presuming that the several parts are in the position shown in Figs. 1 and 3, and the faucet connected with the outlet pipe E' is opened, then liquid entering by way of the pipe E into the chamber D' passes by way of the ports $a$, $a'$ into the pipe $F^3$ and into the outer end of the measuring receptacle A' to force the piston B' therein inwardly in the direction of the arrow $x'$ (see Fig. 1). The liquid contained in the inner end of the liquid measuring receptacle A' passes by way of the pipe $F^2$ and the port $b$ into the outlet chamber $D^2$ from which the liquid passes by way of the pipe E' and its faucet into a glass or other vessel to be filled. During the inward movement of the piston B' in the direction of the arrow $x'$ the valve C is turned in the direction of the arrow $x$ by the action above described between the valve stem C' and the piston B'. At the time the piston B' nears the end of its inward stroke the ports $a$ and $a'$ are disconnected from the chamber D' and the pipe $F^3$ respectively, and the port $b$ is disconnected from the pipe $F^2$, and at this time the port $a^3$ connects with the chamber D' while the port $a^2$ connects with the pipe F' so that the liquid flows from the chamber D' by way of the said ports $a^3$, $a^2$ and the pipe F' into the outer end of the measuring receptacle A connected by its pipe F with the port $b^2$, so that the liquid flows into the outer end of the measuring receptacle A and out of the inner end by way of the pipe F and the port $b^2$ into the chamber $D^2$ and to the pipe E' and out of the faucet thereof into the glass or other vessel to be filled. It is understood that the liquid flowing into the outer end of the measuring receptacle A forces the piston B therein in an inward direction to insure a further rotation of the valve C, and at the time the piston B nears the inner end of its stroke the valve C has been turned sufficiently to connect the port $a$ with the pipe $F^2$ to direct the liquid into the inner end of the measuring receptacle A', the outer end of which is now connected by the pipe $F^3$ and the port $b$ with the outlet chamber $D^2$. The port $a^3$ is still in communication with the chamber D' so that the liquid can flow from the latter by way of the ports $a^3$, $a$ into the pipe $F^2$ and into the inner end of the measuring receptacle A' to push the piston B' outward therein. When the piston B' nears the outer end of its stroke the valve C has been turned sufficiently to move the port $a^2$ into register with the pipe F so that the liquid can now flow from the chamber D' by way of the ports $a^3$, $a^2$ and pipe F into the inner end of the measuring receptacle A to push the piston B outward therein. The outer end of the measuring receptacle A is now connected by the pipe F' with the port b' to allow the liquid to flow from the outer end of the measuring receptacle A into the chamber D² and to the pipe E' having the withdrawing faucet.

From the foregoing it will be seen that as long as the faucet is open liquid flows in a continuous stream through the liquid measuring device, and the rotation given to the valve C as above described causes an actuating of the register N which registers the amount of liquid drawn out of the container during the time the faucet is open. As soon as the faucet is closed the operation of the liquid measuring device ceases, but as soon as the faucet is opened again a continuous flow of liquid is had, and the amount of liquid withdrawn is registered by the register N. It will be noticed that by the arrangement described an accurate tally is had on the amount of liquid periodically withdrawn from the container.

It is understood that beer and other liquids contained in barrels are usually under pressure and consequently flow readily through the measuring device to the dispensing faucet, but in case no pressure is on the liquid in the container then the liquid measuring device is located sufficiently below the container so that the head of the liquid provides sufficient pressure to actuate the device as above explained.

In the modified form disclosed in Figs. 8 and 9 the measuring receptacles are in the form of two bellows A², A³, connected at their fixed ends with the pipes F, F' and F², F³ leading to the valve casing D containing a valve C of the same construction as above described in reference to Figs. 1 to 7. Movable heads or pistons B⁶, B⁷ are arranged in the bellows A², A² and are provided with arms G⁴, G⁵ connected with the toggle levers formed of the arms I, I', I², I³ and I⁴, I⁵, I⁶, I⁷ and pawls J, J', J², J³ with the ratchet wheel K secured on the valve stem C' for turning the valve C. The outlet pipe E in this case connects with an apertured lug O secured into the bunghole of the container. The operation is practically the same as above described in reference to the liquid measuring device shown in Figs. 1 to 7, the only difference being that the pipe E connected with the chamber D' leads to the atmosphere, and when the faucet for withdrawing the liquid from the container is opened and liquid flows out of the container then air is drawn in by way of the liquid measuring device into the container and this air in passing alternately into the ends of the bellows A², A³ causes the pistons B⁶, B⁷ to reciprocate to turn the valve C in the same way as above described. As the amount of air passing into the container by way of the liquid measuring device is the same as the amount of liquid withdrawn therefrom it follows that the amount registered at the registering end indicates the amount of liquid withdrawn from the container.

Having thus described my invention, I claim as new and desire to secure by Letters Patent:

1. A liquid measuring device, comprising a valve casing provided with an inlet and an outlet for the fluid and adapted to be connected with the container containing a liquid to be measured, a valve mounted to turn on the said valve casing and having sets of ports and actuating and measuring devices connected with the said valve casing, the said actuating devices having movable members under the influence of the pressure of the fluid passing into and out of the actuating devices, and driving means connecting the said movable members of the actuating and measuring devices with the said valve for imparting a continuous turning motion to the valve on withdrawing a portion of the liquid from the container.

2. A liquid measuring device, comprising a valve casing provided with an inlet and an outlet for the liquid and adapted to be connected with the container containing a liquid to be measured, a valve mounted to turn on the said valve casing and having sets of ports and actuating and measuring devices connected with the said valve casing, the said actuating devices having movable members under the influence of the pressure of the fluid passing into and out of the actuating devices, driving means connecting the said movable members of the actuating and measuring devices with the said valve for imparting a continuous turning motion to the valve on withdrawing a portion of the liquid from the container, and a register connected with and driven from the said valve to register the amount of the fluid passing through the valve.

3. A liquid measuring device, comprising a valve casing having an inlet and an outlet, a valve mounted to turn in the valve casing and having inlet and outlet ports, of which the inlet ports are at all times in communication with the said casing inlet and the said outlet ports are at all times in communication with the said casing outlet, measuring receptacles having their ends connected with the said valve casing to connect each end of a measuring receptacle alternately with corresponding inlet ports and outlet ports, movable members in the said measuring receptacles and under the influence of the fluid passing into and out of the measuring receptacles, and a driving connection between the said movable member and the said valve to continually rotate the valve and thereby cause a continuous flow of the fluid to and from the measuring receptacles and through the valve.

4. A liquid measuring device for attachment to a closed container containing a liquid under pressure, comprising a valve casing provided with an inlet and with an outlet, a valve mounted to turn in the said valve casing and having two sets of ports, of which one set is adapted to register with the said inlet and the other with the said outlet on turning the valve, measuring cylinders having their ends connected with the said valve casing to register with the said sets of ports, pistons movable in the said measuring cylinders, and driving means connecting the said pistons with the said valve to rotate the latter.

5. A liquid measuring device for attachment to a closed container containing a liquid under pressure, comprising a valve casing provided with an inlet and with an outlet, a valve mounted to turn in the said valve casing and having two sets of ports, of which one set is adapted to register with the said inlet and the other with the said outlet on turning the valve, measuring cylinders having their ends connected with the said valve casing to register with the said sets of ports, pistons movable in the said measuring cylinders, a ratchet wheel secured on the stem of the said valve, toggle levers fulcrumed loosely on the said stem and carrying pawls engaging the said ratchet wheel, and slides connected with the said toggle levers to open and close the same, the said slides being connected with the said pistons.

6. A liquid measuring device for attachment to a closed container containing a liquid under pressure, comprising a valve casing provided with an inlet and with an outlet, a valve mounted to turn in the said valve casing and having two sets of ports, of which one set is adapted to register with the said inlet and the other with the said outlet on turning the valve, measuring cylinders having their ends connected with the said valve casing to register with the said sets of ports, pistons movable in the said measuring cylinders, a ratchet wheel secured on the stem of the said valve, toggle levers fulcrumed loosely on the said stem and carrying pawls engaging the said ratchet wheel, slides connected with the said toggle levers to open and close the same, the said slides being connected with the said pistons, and a register geared with the valve stem for registering the amount of liquid drawn out of the container.

7. A liquid measuring device for attachment to a closed container containing a liquid under pressure, comprising a valve casing provided with an inlet connected with the receptacle, the valve casing having an outlet for the measured liquid, a valve mounted to turn in the said valve casing and having a set of inlet ports and a set of outlet ports, the inlet ports being in register with the said inlet and outlet ports opening into the said outlet, measuring cylinders connected at their ends with the said valve casing to connect alternately with the said sets of ports, pistons in the said cylinders, and means connecting the said pistons with the valve to rotate the latter and to cause a continuous flow of the liquid to and from the cylinders and through the valve.

In testimony whereof I have signed my name to this specification in the presence of two subscribing witnesses.

EDWARD AUGUST APPELL.

Witnesses:
THEO. G. HOSTER,
PHILIP D. ROLLHAUS.